May 15, 1945.  F. D. BRADDON  2,375,764
GYRO MAGNETIC COMPASS CONTROLLING MEANS
Filed Jan. 19, 1943  2 Sheets-Sheet 1
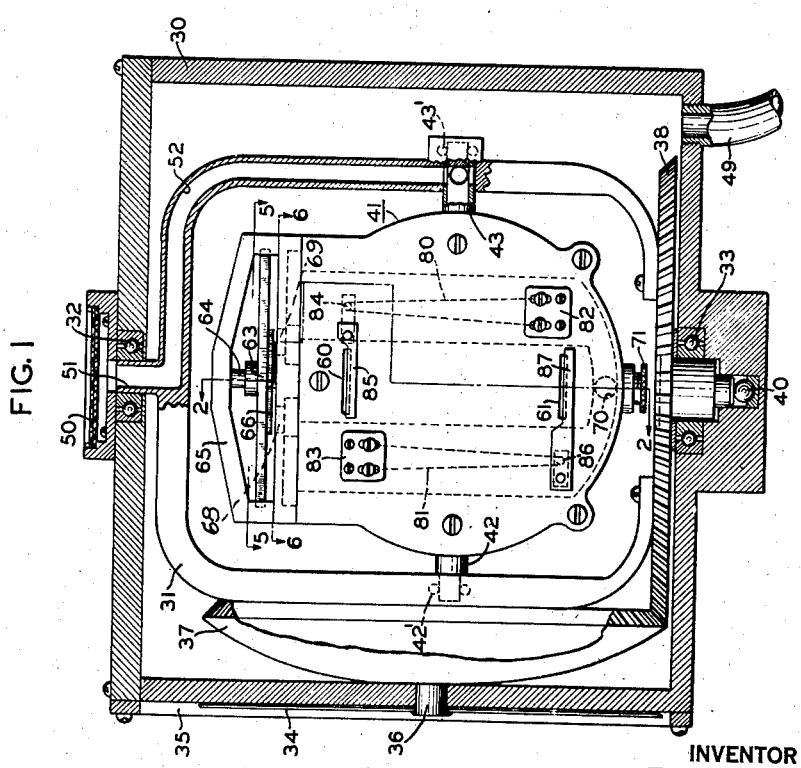
INVENTOR
F. D. BRADDON
BY
his ATTORNEY May 15, 1945.  F. D. BRADDON  2,375,764
GYRO MAGNETIC COMPASS CONTROLLING MEANS
Filed Jan. 19, 1943  2 Sheets-Sheet 2
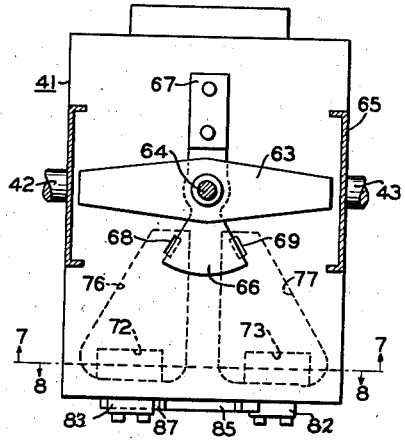
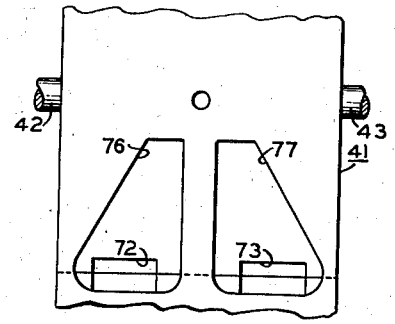
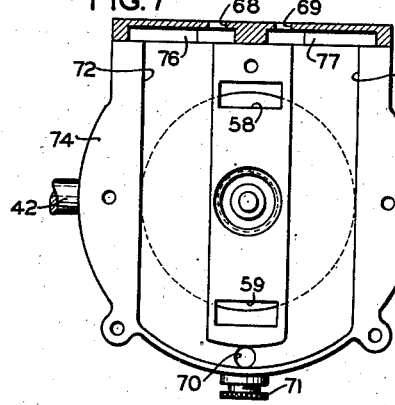
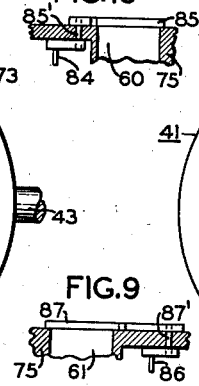
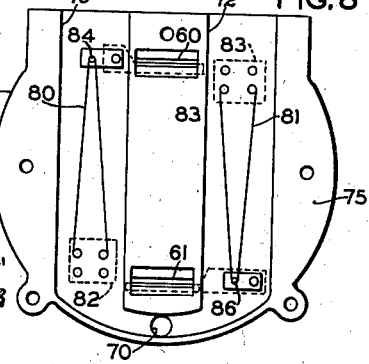
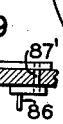
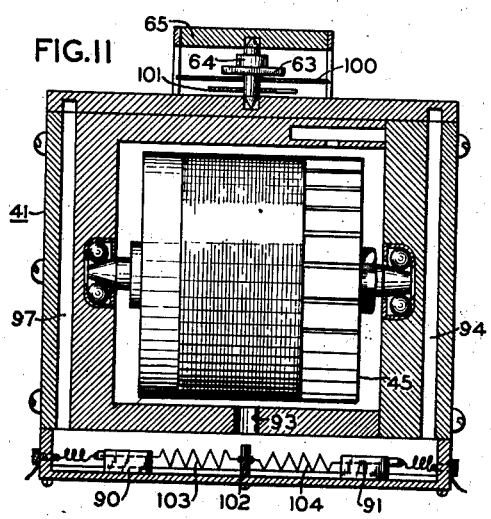
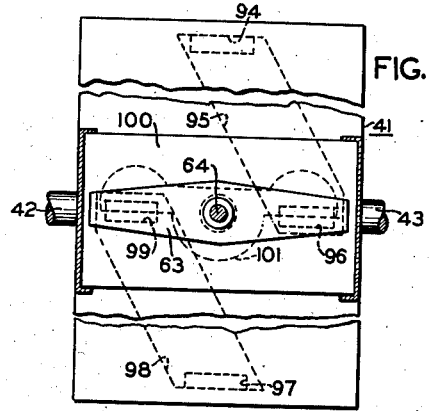
INVENTOR
F. D. BRADDON
BY
Herbert H. Thompson
his ATTORNEY.

Patented May 15, 1945

2,375,764

UNITED STATES PATENT OFFICE 2,375,764

GYROMAGNETIC COMPASS CONTROLLING MEANS

Frederick D. Braddon, Babylon, N. Y., assignor to Sperry Gyroscope Company, Inc., Brooklyn, N. Y., a corporation of New York Application January 19, 1943, Serial No. 472,910

4 Claims. (Cl. 33—222)

This invention generally relates to gyroscopic controlling means and more particularly is directed to a thermal means for effecting selective operation of a torque exerting device.

The primary feature of the present invention resides in the provision of a thermally responsive differential selector for controlling the operation of a torque exerting device about the axis of the rotor bearing case of a gyroscopic instrument of the gyro magnetic compass type.

Other features and structural details of the invention will be apparent from the following description when read in relation to the accompanying drawings wherein, Fig. 1 is a side elevation view of a gyroscopic instrument of the gyro magnetic compass type constructed in accordance with the teaching of the present invention, the casing of the instrument being shown in section.

Fig. 2 is a detail cross-section view of the rotor bearing case of the instrument shown in Fig. 1, the view being taken on line 2—2 in that figure.

Figs. 3 and 4 are detail circuit diagrams.

Fig. 5 is a section of the rotor bearing case taken on line 5—5, in Fig. 1.

Fig. 6 is a view similar to Fig. 5 taken on line 6—6, in Fig. 1.

Fig. 7 is a section view taken on line 7—7, in Fig. 5.

Fig. 8 is a section view taken on line 8—8, in Fig. 5.

Figs. 9 and 10 are detail sectional views showing the pivotal mountings of the respective torque controlling vanes on the rotor case.

Fig. 11 is a section view similar to Fig. 2 showing a modified form of invention, and Fig. 12 is a view similar to Fig. 5 of the rotor bearing case construction.

With reference to Fig. 1, the conventional parts of the gyro magnetic compass instrument shown in the drawings include an outer casing 30 within which a vertical ring 31 is suitably mounted for movement about a vertical axis. This mounting may be provided by bearings 32 and 33 located in the upper and lower walls of the outer casing, respectively. Ring 31 controls the movement of a conventional type of compass card 34 situated adjacent a transparent portion 35 of the front wall of the outer casing 30, the card being mounted on a shaft 36 that is moved by means of the meshed crown and bevel gears 37 and 38, respectively. In the construction shown, the bevel gear 38 forms the base of the vertical ring 31. Thrust bearing 40 in the base of the outer casing takes the gravitational load of the weight of the vertical ring 31 and the gyroscopic parts mounted thereon.

With reference also to Figs. 2 and 5 through 8, inclusive, the rotor bearing case of the illustrated gyro magnetic compass instrument is generally indicated at 41. The case in the present instance is mounted in a conventional manner between the upwardly extending arms of the vertical ring 31 by means of trunnions 42 and 43 and suitable bearings 42' and 43'. The thus defined tilt or horizontal axis of the case is located in mutually perpendicular relation to the axis of the ring 31. Within the case 41, as shown in Fig. 2, a gyro rotor 45 is fixedly mounted on shaft 46 having journal forming ends that engage the spaced bearings 47 and 48. Gyro rotor 45 as shown may be a non-inductive rotor of the type more particularly shown and described in my copending application Serial No. 434,771, filed March 14, 1942, on this subject matter.

The spin axis of the rotor 45 normally lies in a horizontal plane that includes the axis of the case 41, the rotor axis and case axis being mutually perpendicular. The gyro rotor is shown as pneumatically spun in the present instance, air being withdrawn from the casing 30 by way of outlet 49 by means of a suitable suction means (not shown). Atmospheric air is admitted to the case 41 by way of filter 50, hollow trunnion 51, channel 52 in the vertical ring 31, hollow trunnion 43 to the circular passageways 53 formed in the case. Nozzle forming openings 54 direct the air in the passageways to impinge the same on the buckets 55 of the rotor 45.

The means provided in this form of the invention for exerting a torque about the horizontal axis of the case to cause precession of the ring is pneumatic. In this connection, the air withdrawn from the interior of the rotor bearing case is employed to obtain the torque. The air within the case discharges through exhaust ports 58 and 59 in the case which terminate in the narrower slot openings or ports 60 and 61, Figs. 1, 2, 7 and 8. Openings 60 and 61 are situated the same radial distance above and below the tilt axis of the case 41 so that the air discharging therefrom into the casing 30 normally exerts equal and opposite torque about the axis of the case. The continuous air jets issuing from the openings 60 and 61 in the case 41 may be obtained in other manners now known to the art if so desired.

Further, the improved gyro magnetic compass instrument includes a direction maintaining means or azimuth standard of position which is instrumental in maintaining the gyro case in a properly oriented position relative to the earth. As shown, such means comprises a magnetic compass having a sensitive element mounted on the case. The sensitive element shown in the drawings is a magnet 63 which is mounted for pivotal movement about a vertical axis on the top of the rotor bearing case 41. As particularly shown in Figs. 1, 2 and 5, bar 63 is mounted on a shaft 64, contained in a frame 65 situated on the top of the case. A controller is also provided which operates responsive to angular displacement of the ring from a normal position in azimuth. This controller includes a segmental vane 66 which is fixed to the shaft 64 and is suitably counterbalanced by a weight piece 67. As shown in Fig. 5, the vane is positioned in azimuth by means of the magnet bar 63. The oppositely disposed straight edges of the segmental vane 66 normally intercept equal portions of the air jets issuing from two ports 68 and 69 situated in the top of the case. The position determining ports 68 and 69 of the case are smaller than ports 60 and 61 and are situated relatively close to the axis of the case so that the torque effect on the case from the reaction of the air issuing from the same is negligible. Air is drawn through the ports 68 and 69 and into the evacuated casing 30 by the previously mentioned suction means. Air supplied the ports 68 and 69 is obtained from the interior of the rotor bearing case by way of passageway 62, Fig. 2, which leads to a circular port 70. A valve 71 may be employed to control the volume of air passing through the passageway 62. As shown in Figs. 7 and 8, port 70 leads to two oppositely disposed channels 72 and 73 provided by arranging contiguous grooves in the end plate 74 of the case 41 and in a special cover plate 75 which is fixedly mounted on the case in a suitable manner. Channels 72 and 73 lead to the opposite passageways 76 and 77 in the top of the case 41 in which the ports 68 and 69 are located.

In accordance with the teaching of the present invention, thermal means are employed which respond to the control of the described controller to differentially effect operation of the torque exerting means. As shown, the thermal means is provided by a differentially cooled pair of heated wires 80 and 81 located in the respective channels 72 and 73. The ends of the wires 80 and 81 are fixed to suitable terminal blocks 82 and 83, respectively, mounted on the cover plate 75. Wires 80 and 81 are formed of an electrically conductive material having a relatively high coefficient of expansion and heat radiation. As shown in Fig. 4, the wires may be heated by supplying the same with electrical energy of a suitable character such as a battery. The respective wires extend, in this instance, in a V-shape within the channels 72 and 73. With reference to Fig. 9 particularly, wire 81 is connected to an insulated pin 86 at its apex forming portion. Pin 86 controls a rocker member on the case 41 which positions a vane 87 so that it normally bisects the opening or port 61 in the case 41. Wire 80 similarly engages a pin 84, Fig. 10, which positions the vane 85 so that it normally bisects the opening or port 60 in the case. The force of gravity is effective to exert a continuous effort to move the vanes 85 and 87 about their respective pivotal axes 85' and 87', Figs. 9 and 10, this effort being resisted by the wires 80 and 81, respectively, which consequently position the vanes. A desired leveling torque or torques about the axis of the vertical ring 52 of the described gyro magnetic compass instrument may be obtained in any manner now well known in the art, the same consequently not being shown herein.

In the operation of the described type of gyro magnetic compass, when the ring 31 (ports 68 and 69 in the case 41) and vane 66 moves to a position of angular displacement other than normal, one of the ports 68, 69 is opened and the other is closed. If, for example, port 68 is opened and port 69 is closed, the air passing through passageway 70 from the interior of the case does not divide and flow in equal volume through channels 72 and 73. In this event, the air in channel 73 is substantially blocked and substantially all of the air moves through channel 72. Wire 80 consequently expands permitting the vane 85 to assume a lower position as viewed in Fig. 1 and more air to issue from the port 60. Wire 81 contracts due to the cooling effect of the additional air passing through channel 72 which raises the vane 87 as viewed in Fig. 1 to further restrict the effective size of the port 61 and reduce the volume of air passing therethrough. The described type of thermal means operates in response to the controller to control the torque exerting means which in this instance is pneumatic to precess the ring so that the core is restored to its normal position with relation to the standard of position.

Figs. 3, 11 and 12, illustrate a modification of the invention in which gravitationally responsive means are employed to exert the torque about the horizontal axis of the case 41. Such means are shown in Fig. 11, in the form of two weight members 90 and 91 which are adapted to slide in a channel formed in the base of the case 41. The weights are located in a passageway 92 that receives air from a central port 93 from the interior of the rotor bearing case. The air received in passageway 92 normally divides, and equal parts of the same move to the right and left as viewed in Fig. 11 through the passageway 92. The air moving to the right in the figure passes through a channel 94 at one end of the case, communicating channel 95 and then through port 96 in the top of the case. The air moving to the left, as viewed in the figure, passes through channel 97, communicating channel 98 and then port 99 in the top of the case. The air passing through the ports 96 and 99 impinges on a fixed shield 100 on the frame 65 and consequently does not affect the normal operation of the magnetic compass. The vane 101 which is positioned by the magnet 63 normally bisects the air issuing from the oppositely disposed ports 96 and 99, the function of the ports being similar to that previously described. Ports 96 and 99 are situated on the tilt axis of the case 41 and consequently exert no torque about this axis of the case. A central fixed insulating post 102 is located in the passageway 92, the same providing a mounting for two electrical energy conducting resistance wires 103 and 104 which are secured to the respective weights 90 and 91. The wires position the weights and are electrically heated by means of a battery and circuit therefor as shown in Fig. 3. The wires are constructed of sufficient rigidity to definitely position the weights with respect to the post 102. The controlled air flow over the wires differentially effects movement of the weights towards or away from the post as viewed in Fig. 11 to control the operation of the gravitational torque on the case 41 in a manner that restores the parts to their normal position.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In a gyro-magnetic compass, a gyro rotor case mounted with freedom about a vertical axis and a horizontal axis, an element responsive to the earth's magnetic field mounted on said case for movement about a vertical axis, differential air flow means on said case responsive to angular displacement between said element and said case about the respective vertical axes thereof, a pair of heated wires on said case differentially cooled by said air flow means, and means for exerting a torque about the horizontal axis of said case differentially controlled by the expansion and contraction of said wires.

2. A gyro-magnetic compass as claimed in claim 1, in which said torque exerting means comprises air jet means having shutters pivotally mounted on said case and positioned by said wires.

3. Means for exerting a precession inducing torque about the horizontal axis of the gyro rotor case of a gyro-magnetic compass instrument comprising a magnet mounted on the gyro case for movement about a vertical axis, a differential air flow controller responsive to departure of the magnet and rotor case from a predetermined azimuthal relation, thermostatic means on said case differentially cooled by said air flow controller, a pair of shutters pivotally mounted on the rotor case connected to be operated by said thermostatic means, and air jet means on said case differentially intercepted by said shutters whereby a torque is exerted on said rotor case to cause precession restoring said relation.

4. Means for exerting a precession inducing torque about the horizontal axis of the gyro rotor case of a gyro-magnetic compass instrument comprising a laterally shiftable mass on said case, thermostatic means for shifting the position of said mass, a magnet mounted on the case for movement about a vertical axis, and differential air flow means operable upon departure of the rotor case and magnet from a predetermined azimuthal relation to differentially cool said thermostatic means and thereby shift said torque exerting mass to a torque exerting position to cause precession restoring said relation.

FREDERICK D. BRADDON.